United States Patent [19]

Niks et al.

[11] 4,219,589
[45] Aug. 26, 1980

[54] PROCESS FOR UREA GRANULATION

[75] Inventors: Anton Niks, Sledderlo bij Genk; Willy H. P. Van Hijfte, Assenede; Rafaël A. J. Goethals, Ertvelde, all of Belgium

[73] Assignee: Compagnie Neerlandaise de l'Azote, Brussels, Belgium

[21] Appl. No.: 908,512

[22] Filed: May 22, 1978

[30] Foreign Application Priority Data

Jun. 9, 1977 [GB] United Kingdom ............... 24160/77
Apr. 19, 1978 [GB] United Kingdom ......... 15529/78

[51] Int. Cl.² .......................... B05D 1/12; B05D 3/02
[52] U.S. Cl. ...................................... 427/213; 71/28; 71/64 DB; 159/45; 159/47 UA; 159/DIG. 3; 159/DIG. 21; 260/707; 427/374.1
[58] Field of Search .......... 427/213, 182, 421, 374 R; 71/28, 64 C, 64 DB; 260/707; 159/47 UA, DIG. 3, DIG. 21, 45

[56] References Cited

U.S. PATENT DOCUMENTS

| | | | |
|---|---|---|---|
| 2,561,392 | 7/1951 | Marshall | 427/213 |
| 2,919,184 | 12/1959 | Osswald et al. | 159/47 UA |
| 3,117,020 | 1/1964 | Fabris et al. | 427/213 |
| 3,124,612 | 3/1964 | Cook | 260/707 X |
| 3,477,842 | 11/1969 | Cook et al. | 71/28 |
| 3,908,045 | 9/1975 | Alterman et al. | 427/213 |
| 4,026,864 | 5/1977 | Diethelm et al. | 427/213 X |
| 4,071,304 | 1/1978 | Chauvin et al. | 427/213 X |

*Primary Examiner*—John D. Smith
*Assistant Examiner*—Thurman K. Page
*Attorney, Agent, or Firm*—Scully, Scott, Murphy & Presser

[57] ABSTRACT

Urea granules are prepared by spraying an aqueous urea solution having a urea concentration of 70-99.9% by weight on to fluidized urea nuclei in the form of droplets having a mean drop diameter of 20-120 μm at a temperature at which the water is evaporated from the solution sprayed on to the nuclei and urea crystallizes on the nuclei to form granules having a desired size.

11 Claims, 1 Drawing Figure

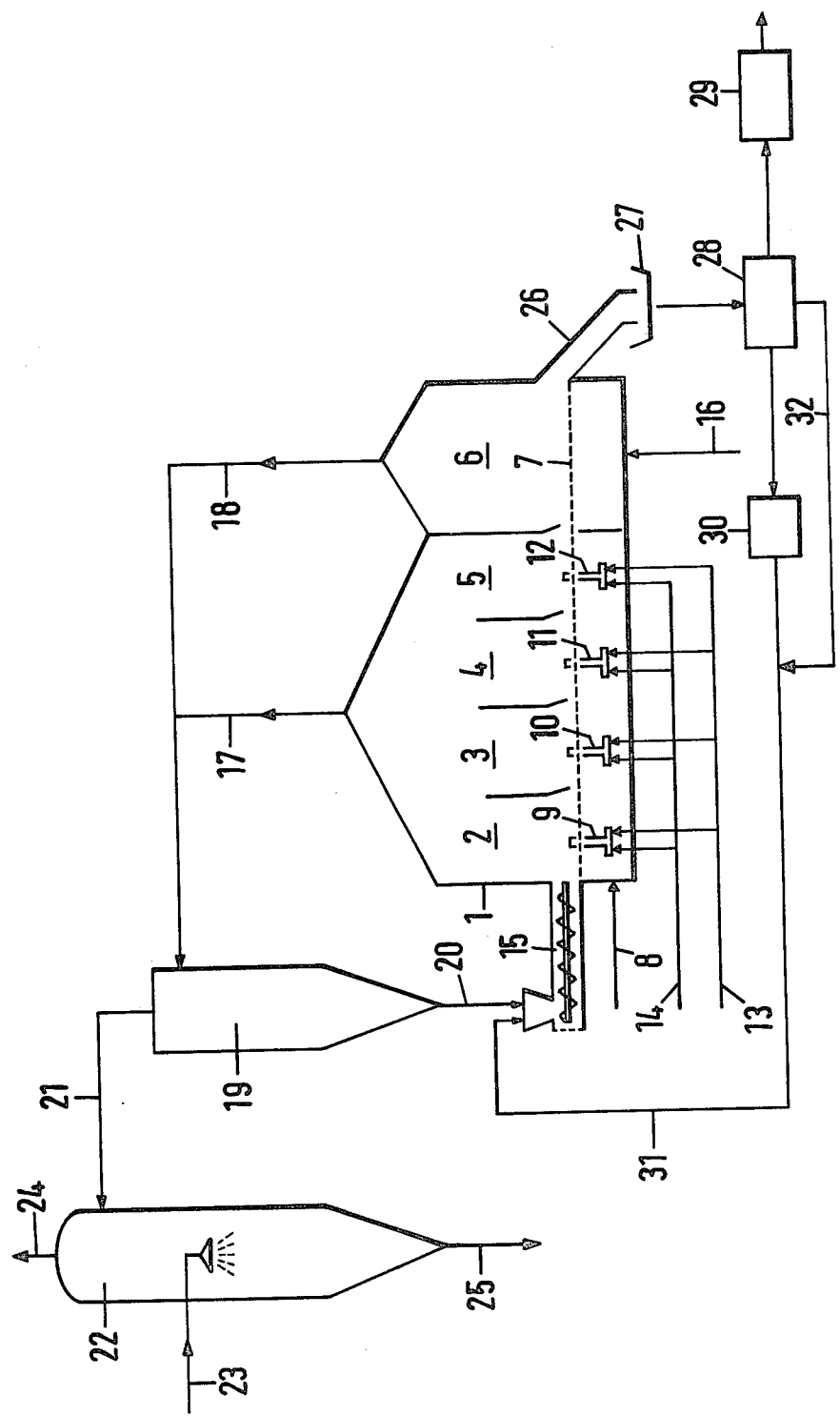

PROCESS FOR UREA GRANULATION

Urea granules are widely applied for manuring purposes, either as such or as a component of a mixture of different fertilizers. The size of the urea granules depends on their use, and is, for example, 1.5-4 mm for bulk blending and 5-10 mm for forest fertilizer dressings.

Urea granules are produced by granulation of a urea melt, which is prepared in urea synthesis units. In order to keep down capital outlays and the costs of operation, it is generally desirable for the granulation of the entire production of a urea synthesis unit to be carried out in one granulator unit only. This is possible in the urea "prilling" process, which comprises spraying a substantially anhydrous area melt in the top of a tower, and cooling the resulting droplets during their fall with upwardly flowing cooling gas so that they are solidified. Urea prills contain internal cavities, which are formed owing to the shrinkage occurring during the rather sudden solidification of the material, and which cause internal stresses in the prills. As a consequence urea prills are mechanically weak; they have a low crushing strength, a low impact resistance, and a tendency of forming fly dust owing to abrasion, which properties, among other objections, render the prills unsuitable for pneumatic transportation. Fly dust is an extremely fine, hydroscopic powder which pollutes the working atmosphere, and hence is objectionable to personnel in charge of handling the material. Furthermore, this dust give rise to problems in sealing the plastic bags in which the prills are packed.

In an article in "Nitrogen" 95, pp. 31-36 (1975), two techniques are described for the production of urea granules having greater hardness and strength and, if desired, a larger diameter than urea prills. According to both techniques a substantially anhydrous melt of urea is sprayed on to urea nuclei, in one case in a can granulator and in the other in a drum granulator of special construction. The urea granules produced by these techniques have better physical properties than urea prills. A disadvantage of these techniques is, however that both can granulators and drum granulators, when having practically feasible dimensions, only have a limited capacity, so that mostly more than one granulator is needed for processing the production of a urea synthesis unit into granules.

It is an object of the present invention to provide a process for the production of urea granules having a desired size between 1.5 and 25 mm or even larger dimensions, a good sphericity and a smooth closed surface, a high crushing strength, a great resistance to impact and a slight tendency of forming fly dust through abrasion, so that for one thing they are suitable for pneumatic transportation, and which granules remain free flowing even after prolonged storage, have an excellent chemical composition: low values for moisture, biuret, free $NH_3$ and $CO_2$ contents (low buffer capacity), are excellenty suitable for technical uses, and form an excellent substrate for the production of slow-release urea (such as sulphur-coated urea).

This object is realized, according to the invention, by spraying an aqueous urea solution having a urea concentration of 70-99.9% by weight, on to fluidized urea nuclei in the form of droplets having a mean drop diameter of 20-120 $\mu$m, preferably 100 $\mu$m and in particular 30-60 $\mu$m and a temperature at which the water evaporates from the solution sprayed on the nuclei and urea cristallizes on the nuclei to form granules having a desired size.

During the fluid-bed granulation the granules being formed are continuously exposed to vigorous collision and friction with other particles which is apt to cause abrasion of the top layer of the granules to form fine dust.

It has been found that this dust formation can be depressed by spraying the urea solution in the form of very fine droplets having an average size of 20-120 $\mu$m, which, once deposited on the granules, dry so rapidly that the top layer is continuously kept "dry"; this dry, i.e. anhydrous, top layer is much better resistant to abrasion than a "wet", i.e. water, containing top layer.

It has further been found that the formation of dust can be substantially avoided if, in accordance with a preferred embodiment of the process according to the invention, there is added to the urea solution to be sprayed a crystallization retardant for urea, which retards the crystallization of the urea deposited on the granules, so that the top layer, although free of water, contains a relatively large proportion of liquid phase for some time and thereby remains plastic, which has turned out to considerably enhance the resistance to dust formation. This addition is more important according as the urea concentration of the urea solution to be sprayed is lower, in particular less than 95% by weight, and more particularly less than 90% by weight.

The application of this preferred embodiment of the process according to the invention is productive of urea granules having an exceptionally high resistance to dust formation.

Preferred crystallization retardants for the urea are formaldehyde and water-soluble addition and/or condensation products of formaldehyde and urea. The production of water-soluble addition products of formaldehyde and urea is known, for example, from U.S. Pat. No. 3,067,177, and the production of water-soluble condensation products of formaldehyde and urea is disclosed in U.S. Pat. No. 3,112,343. It is also possible to use addition products of formaldehyde and urea produced in the first place in an alkaline medium and then condensed in an acid medium to form thin-liquid to syrupy liquids, such as the liquid adhesives used in the chipboard industry. The crystallization retardant is preferably added in a proportion of 0.1-2.0%, preferably 0.1-1.0%, most preferably 0.5-1.0%, calculated as formaldehyde on the weight of the urea solution.

The aqueous urea solution sprayed on to the fluidized urea nuclei has a urea concentration of 70-99.9% by weight, preferably 85-96% by weight. The use of a solution having a urea concentration of 85-96% by weight offers various advantages.

In the first place, in the urea synthesis unit, it is no longer necessary to apply the rather expensive concentration of the solution to a substantially anhydrous product, as is required in the prilling process and in granulation with can or drum granulators. In the second place, such a solution may have a low biuret content, as this content increases markedly especially upon evaporation of the solution to a substantial anhydrous product. In spite of the fact that, in this preferred embodiment of the process according to the invention the solution to be granulated is not anhydrous, but contains 4-15% of water, it has been found that a high specific granulation capacity (the quantity of urea by weight that can be granulated per unit of bed surface area) of 2-4 ton per hour per m² bed surface area can be achieved.

The urea solution is sprayed with a gas, such as air. Preferably the solution is sprayed within the fluidized bed of urea nuclei, as spraying on to the bed involves the risk of the sprayed droplets being entrained by the fluidization air issuing from the bed. The pressure of the spraying air is preferably 147-392 kPa (1.5-4 ata). This pressure has a highly important effect on the size of the sprayed droplets. The higher the pressure, the smaller are the sprayed droplets. The mean drop diameter can be calculated on the basis of empirical formulae which according to W. R. Marschall, "Atomization and Spray Drying", A.I.Ch.Monograph, Vol. 50 pp 74-75, can be developed in dependence upon the size of the air sprayers used. In the case of sprayers for granulation, the following formula by Nukiyama and Tanasawa applies:

$$D = \frac{54.4}{V}\sqrt{\frac{s}{d}} + 597 \cdot \left(\frac{v}{\sqrt{s.d.}}\right)^{0.45} \cdot \left(\frac{1000 Q_1}{Q_2}\right)^{1.5}$$

wherein:
D = the mean drop diameter in $\mu$m
V = the relative velocity of the air relative to the liquid in m/sec.
s = the surface tension in dynes/cm
v = the viscosity of the liquid poises
d = the specific gravity of the liquid g/cm³ and
$Q_1/Q_2$ = the ratio of the volume of liquid to the volume of gas.

The specific gravity can be determined with reference to M. Frejaques, "Les bases théorique de la synthèse industrielle de l'urée", Chimie et Industrie 60 (1948), pp. 22-35.

The surface tension is calculated according to the formula: $s^{\frac{1}{4}} = k.d$. (S. Glasstone, Textbook of Physical Chemistry, 2nd Edition, (1956), page 494). The surface tension at boiling point is $S_{bp} = 21\ T_{bp}d_{bp}/364$ (J. H. Perry, Chemical Engineers Handbook, 4th Edition, (1963) pp. 3-221 and 223). The surface tension under trial conditions is: $S = S_{bp}(d/d_{bp})^4$. The viscosity of the urea solution is determined by means of International Critical Tables. The temperature T is expressed in °Kelvin in all instances.

The air flow rate after adiabatic expansion at a temperature T from a supercritical initial pressure P is given bij $Q_2 = k.P.\sqrt{T}$. From this the constant k can be calculated, as the sprayers used in the examples, at room temperature (20° C.) and an initial pressure of 216 kPa (2.2 ata), provide a flow rate of 30 m³/hour. Therefore k = 0.008 m³/h.kPa.°K. (0.80 m³/h.at.°K.). From this air flow rate, the air velocity is calculated, with a head diameter of 5.8 mm: air velocity = $Q_2$ (in m³/hour/3600·surface area (in m²). As the liquid velocity is negligible relative to the air velocity, V can be equalized to the air velocity. The urea flow rate per sprayer is known. The calculation of the mean drop size will be elucidated further in Example I.

The size of the urea nuclei supplied to the fluidized bed in which the granulation takes place generally ranges between 0.2 and 4 mm, and may be larger within this range according as larger urea granules are to be made.

The temperature of the fluidized bed of urea nuclei generally ranges between 70° and 110° C., preferably between 80° and 100° C. Within these limits, the temperature may be lower according as the urea concentration of the solution sprayed on to the nuclei is higher. The temperature of the fluidized bed can be controlled by a suitable selection of the temperatures of the fluidization air and of the urea solution being sprayed.

The urea solution is sprayed over the urea nuclei in the form of very fine droplets having an average diameter of 20-120 $\mu$m. Under the influence of the temperature prevailing in the fluidized bed, the water is evaporated from the solution and the urea crystallizes on the surface of the urea nucleus. Owing to the small size of the droplet these will generally be able to cover a portion of the surface of the individual urea nuclei only. It is thus prevented that an onion-like structure of the granules is formed, in which the nucleus is coated in succession with essentially superimposed layers. As a consequence, the granules according to the present invention do not exhibit the stresses inherent in an onion-like structure. It is considered that the excellent mechanical properties of the urea granules according to this invention are due to the absence of these stresses. A further advantage of the minute drop size of the sprayed urea solution is that the water can be fully evaporated from it in a short time.

For the purpose of removing superficial moisture, the resulting granules can be subjected, if so desired, to subsequent drying for about 5-10 minutes with air of 100° to 150° C., so that the temperature of the granules is maintained between 70° and 90° C. Thereafter the granules are preferably cooled to a temperature of approximately 30° C. or lower. Cooling can be effected in any suitable cooling apparatus, for example, in a fluidized-bed cooler.

The product produced by the process according to the present invention contains only small quantities of free $NH_3$, $CO_2$, moisture and biuret, and has such mechanical properties that it is suitable for pneumatic transportation, and remains free flowing even after prolonged storage. A particular advantage of the process according to the invention is that the formation of biuret during the granulation can be prevented almost entirely by spraying a urea solution whose crystallization point is below 100°. Thus by spraying a urea solution having a urea content of, for example, 75-85% by weight and a biuret content of less than 0.1%, urea granules with a biuret content of less than 0.1% can be obtained. Such urea granules are particularly desirable for certain crops, such as tobacco and tomatoes.

The urea granules produced by the process of this invention are highly suitable for being coated with, for example, sulphur, to form slow-release granules, as, owing to their excellent sphericity and their closed surface, the required amount of coating material is minimized.

BRIEF DESCRIPTION OF THE DRAWING

The sole FIGURE represents a suitable apparatus for carrying out the invention.

The process according to the present invention can be carried out in any type of fluid-bed granulator. One example of suitable apparatus is diagrammatically shown in the accompanying drawing, which shows a granulator 1 divided into a plurality of compartments 2, 3, 4, 5 for the granulation and a compartment 6 for the subsequent drying of the urea granules. The compartment last mentioned is optional as subsequent drying will only be used if the granules still contain superficial water, which may be the case if a relatively dilute area solution is used. Granulator 1 comprises a grid 7, which supports the fluidised bed and transmits the air of fluidization, preheated in one or more heaters not shown and supplied through conduit 8. The space below the grid can be divided in the same way as the space above it, into compartments, in which case the air of fluidization is supplied to each of these compartments. Granulator 1 is further provided at the bottom with pneumatic sprayers 9, 10, 11, 12, which extend to a level above grid 7. It is also possible to use two or more sprayers in each compartment. Through these sprayers, the urea solution supplied through conduit 13, to which a crystallization retardant may have been added, is sprayed with the spraying air supplied through conduit 14 into the granulation compartments 2, 3, 4, 5. The fluidized bed is constituted by urea nuclei, which are supplied by means of a screw conveyor 15. For the subsequent drying of the granules in compartment 6, granulator 1 is equipped with a conduit 16 for supplying drying air.

For the removal of air and possibly entrained dust particles, granulator 1 has discharge conduits 17, 18, which are connected to a cyclone 19, in which very small granules, of a size of approximately 100–500 micron, are separated, which are supplied through conduit 20 to screw conveyor 15. The air from cyclone 19 is conducted through discharge conduit 21 to a device 22, in which the air is washed with a dilute urea solution to remove fine dust and possibly remaining very small granules. In order that a high washing efficiency may be achieved, water may be sprayed into the air through a sprayer 23. The air stripped of dust can escape through discharge conduit 24, and the dilute urea solution formed is discharged through conduit 25.

Granulator 1 further comprises a bottom outlet 26 for urea granules, terminating over a vibratory chute 27, whence the granules are transported to a sieving device 28, in which they are separated into a number of fractions, namely into an undersize fraction, a fraction having the desired sizes, and a oversize fraction. The fraction having the desired sizes is passed through a cooler 29 to a storage site, where further separation into fractions for different purposes can be effected. If desired, the cooler may be arranged upstream of the sieving device. The fraction of oversize granules separated in sieving device 28 is transported after cooling to a crusher 30 in which this fraction is crushed to the same sizes as, or smaller sizes than, those of the undersize fraction. The undersize fraction separated in sieving device 28 is passed through conduit 32 to conduit 31, in which it is conducted to screw conveyor 15 together with the fraction from crusher 30.

The process according to the present invention can be carried out both continuously and batchwise. A urea solution is supplied through conduit 13 and sprayed by means of the spraying air supplied through conduit 14 via sprayers 9, 10, 11, 12 into the fluidized bed of urea nuclei in compartments 2, 3, 4, 5 of granulator 1. The quantity of urea granules removed from the fluidized bed via compartment 6, in which no urea solution is sprayed, and discharge conduit 26 is replaced by urea nuclei supplied by screw conveyor 15.

The size of the product granules depends on a number of factors, such as the number of urea nuclei in the fluidized bed, the size of these nuclei, the quantity of urea solution sprayed per unit of time, and the residence time of the nuclei in the bed. Thus, for example, larger product granules will be obtained, if the number of nuclei in the fluidized bed is reduced and the residence time is prolonged. In order that a predetermined particle size distribution of the product may be maintained, it is necessary for the bed contents to be kept as constant as possible as regards both the particle size distribution and the number of nuclei. This can be achieved by ensuring that the quantity by weight of the urea nuclei, with the correct particle size distribution, to be added to the fluidized bed is at all times in agreement with the quantity by weight of the product granules removed from the bed.

If, through one cause or another, deviations in the desired product sizes occur during the granulation process, these deviations will be automatically corrected in the above-described embodiment of the process: if the product becomes too coarse, a larger oversize fraction will be separated in sieving device 28, the load of crusher 30 will be increased, and a larger number of nuclei will be supplied through line 31 and screw conveyor 15 to the fluidized bed in granulator 1, whereby the average diameter of the granules is reduced. The operation of crusher 30 should be properly controlled: if the broken product is too fine, too much dust is supplied to the fluidized bed, where it either entrained by the fluidization gas, or causes agglomeration; if the broken product is too coarse, too few nuclei are supplied to the fluidized bed.

Owing to the subdivision of the fluidized bed into compartments, a fractionation of the growing granules can be realized. In each compartment the granules having the largest dimensions will mainly be present in the bottom part of the fluidized bed and easily pass to the next compartment.

The invention is illustrated in and by the following examples.

EXAMPLE I

In apparatus similar to that shown in the drawing, but having one granulation compartment, in which two sprayers were disposed, 16 granulation tests were performed batchwise. The sprayers used had an air-head diameter of 5.8 mm, a liquid-tube diameter of 3 mm and an air capacity of 500 l/min. at an air pressure of 216 kPa (1.2 ats overpressure). In all tests, the fluidized bed was approximately 30 cm high. In each test 35 kg urea nuclei was used as the starting material. The other data as well as the results are shown in Table A. In said Table, Formurea 80 is mentioned as one of the crystallization retardants. Formurea 80 is a commercially available product, the preparation of which is described in U.S. Pat. No. 3,067,177, and is an aqueous solution consisting of approximately 20 parts by weight of water, 23 parts by weight of urea and 57 parts by weight of formaldehyde, with approximately 55% of the formaldehyde being substantially bonded as trimethylolurea, and the balance of the formaldehyde being present in non-bonded condition.

In order to show the effect of the pressure of the spraying air, the concentration of the urea solution used, and other factors on the mean drop diameter, and of the mean drop diameter on the physical properties of the product granules, the mean drop diameter has been calculated for all tests. The data required for this calculation and the calculated mean drop diameter values are listed in Tables B and C. The properties of the product granules are specified in Table D.

The TVA abrasion test is described in Special Report S-444 (1970) of Applied Research Branch, Division of Chemical Development, Tennessee Valley Authority, Alabama.

EXAMPLE II

In the same apparatus as used in Example I, in two continuous process granulation tests, 30–35 kg urea nuclei having a grain size of 0.5–2.0 mm were fluidized in a granulator with approximately 700 m³ air of fluidization of 120° C. per hour. As soon as the urea nuclei had reached a temperature of approximately 100° C., an 80% aqueous urea solution to which 0.5% by weight of Formurea 80 had been added was sprayed by two sprayers at a rate of 120 kg/hour with spraying air of 120° C. and 245 kPa (2.5 ata). The mean drop diameter of the sprayed urea solution was approximately 80 μm. In the granulator, the temperature assumed a value of 90°–100° C. owing to the evolved heat of crystallization of the urea and the evaporation of water from the urea solution.

The average size of the product granules is a function of the size of the urea nuclei supplied and of the quantity of sprayed urea solution. In test 17, granules of 2.5–4 mm were made and in test 18 granules of 4–6 mm.

The size distribution of the product granules in the fluidized bed was as follows:

| Test | 17 | 18 | |
|---|---|---|---|
| diameter <2.5 mm, % | 30 | 15 | |
| 2.5–4 mm, % | 60 | 25 | |
| >4 mm, % | 10 | 60 | (of which 10% of diameter >6 mm) |
| product of desired sizes, % | 60 | 50 | |

By continuously removing approximately 170 kg product granules per hour, the quantity of granules in the fluidised bed was kept constant. The product granules were divided by sieving into three fractions:

| Test | 17 | 18 |
|---|---|---|
| product from granulator, kg/h | 170 | 200 |
| of desired size, kg/h | 102 | 100 |
| undersize, kg/h | 51 | 80 |
| oversize, kg/h | 17 | 20 |

The oversize granules were crushed in a crusher and resupplied to the granulator together with the undersize fraction. In this manner the size distribution of the granules in the granulator was kept constant.

The product granules having the desired size were subjected to subsequent drying for 5–10 minutes with air of 100°–150° C. to a product temperature of between 70° and 90° C. Subsequently the product granules were cooled to approximately 30° C.

During the granulation, 2.8% by weight of fine fly dust was formed, calculated on the sprayed quantity of urea solution.

The properties of the resulting urea granules were as follows:

| Test | 17 | 18 |
|---|---|---|
| moisture content, % | 0.10 | 0.10 |
| biuret content, % | 0.45 | 0.44 |
| formaldehyde content % | 0.24 | 0.23 |
| size distribution of the granules, % | <2.5 mm 1.2<br>2.5–4.0 mm 97.3<br>>4.0 mm 1.5 | <4 mm 3.4<br>4–6 mm 94.8<br>>6 mm 1.8 |
| crushing strength kg | diameter 2.5 mm 3.05<br>diameter 3.15 mm 3.35<br>diameter 4 mm 4.25 | diameter 4 mm >5<br>diameter 5 mm >5<br>diameter 6 mm >5 |
| TVA abrasion test, % | <1 | <1 |

TABLE A

| Test no. | | 1 | 2 | 3 | 4 | 4 | 4 | 7 |
|---|---|---|---|---|---|---|---|---|
| Concentration urea solution | % | 72 | 72 | 80 | 80 | 80 | 90 | 96 |
| Temperature spraying air | °C. | 95 | 95 | 95 | 95 | 95 | 125 | 125 |
| Pressure spraying air | kPa(ata) | 147(1.5) | 147(1.5) | 147(1.5) | 147(1.5) | 245(2.5) | 147(1.5) | 172(1.75) |
| Crystallization retardant | | none | Form-urea 80 | none | Form-urea 80 | Form-urea 80 | Form-urea 80 | Form-urea 80 |
| Granulation | | | | | | | | |
| Urea nuclei | | broken granules | broken granules | micro prills | micro prills | broken granules | micro prills | micro prills |
| Urea solution | | | | | | | | |
| concentration | % | 72 | 72 | 80 | 80 | 80 | 90 | 96 |
| temperature | °C. | 90 | 90 | 95 | 95 | 95 | 115 | 125 |
| formaldehyde content | % | none | 0.3 | none | 0.3 | 0.3 | 0.3 | 0.3 |
| rate sprayed (total) | kg/hr | 60 | 55 | 42 | 85 | 85 | 85 | 96 |
| mean drop dia. | μm | 68 | 60 | 39 | 109 | 51 | 106 | 92 |
| Temperature granules in granulator | °C. | 70 | 80 | 85 | 85 | 100 | 100 | 100 |
| Final product after sieving and cooling | | | | | | | | |
| temperature | °C. | 25 | 25 | 25 | 25 | 25 | 25 | 25 |
| chemical analysis | | | | | | | | |
| moisture | % | 0.06 | 0.10 | 0.06 | 0.15 | 0.09 | 0.08 | 0.33 |
| formaldehyde equivalent | % | none | 0.28 | none | 0.22 | 0.25 | 0.23 | 0.22 |
| Granulometry | | | | | | | | |
| >5.0 mm | % | 3.0 | 2.8 | 0 | 0 | 0 | 0 | 15.3 |
| 4.0–5.0 mm | % | 6.9 | 4.5 | 0.2 | 0.9 | 15.0 | 17.6 | 54.5 |
| 2.5–4.0 mm | % | 89.7 | 90.1 | 82.1 | 98.7 | 84.4 | 77.2 | 28.4 |
| <2.5 mm | % | 0.4 | 2.6 | 17.7 | 0.4 | 0.6 | 5.2 | 2.8 |
| Crushing strength | | | | | | | | |
| φ 2.0 mm | kg | 0.42 | 0.85 | 0.50 | 0.98 | 1.61 | 0.91 | 0.85 |
| φ 2.5 mm | kg | 0.65 | 0.99 | 0.70 | 1.30 | 2.05 | 1.26 | 0.97 |
| φ 3.15 mm | kg | — | — | — | — | 2.35 | — | 1.55 |
| φ 4.0 mm | kg | — | — | — | — | 3.71 | — | 1.77 |

TABLE A-continued

| | | | | | | | |
|---|---|---|---|---|---|---|---|
| T.V.A. abrasion test <1.25 mm % of 3.15–4.0 mm fraction | — | — | 4.2 | 2.8 | <1 | 1 | <1 |
| Dust formation during granulation | | | | | | | |
| % dust relative to urea solution sprayed | 30 | 8 | 20 | 5 | 3 | 3 | 3 |

| Test no. | 8 | 9 | 10 | 11 | 12 | 13 | 14 | 15 | 16 |
|---|---|---|---|---|---|---|---|---|---|
| Concentration urea solution | 96 | 96 | 96 | 96 | 96 | 96 | 96 | 96 | 96 |
| Temperature spraying air | 120 | 110 | 105 | 130 | 130 | 130 | 130 | 130 | 130 |
| Pressure spraying air | 196(2.0) | 245(2.5) | 270(2.75) | 245(2.5) | 245(2.5) | 245(2.5) | 245(2.5) | 245(2.5) | 245(2.5) |
| Crystallization retardant | Form-urea 80 | Form-urea 80 | Form-urea 80 | none | Form-urea 80 | Form-urea 80 | Form-urea 80 | Form-maline | U F -condensate |
| Granulation | | | | | | | | | |
| Urea nuclei | micro prills | broken granules | broken granules | broken granules | broken granules | broken granules | broken granules | broken granules | broken granules |
| Urea solution | | | | | | | | | |
| concentration | 96 | 96 | 96 | 96 | 96 | 96 | 96 | 96 | 96 |
| temperature | 125 | 125 | 125 | 125 | 125 | 125 | 125 | 125 | 125 |
| formaldehyde content | 0.3 | 0.3 | 0.3 | none | 0.1 | 0.2 | 0.3 | 0.3 | 0.3 |
| rate sprayed (total) | 84 | 84 | 72 | 75 | 75 | 75 | 75 | 75 | 75 |
| mean drop dia. | 62 | 45 | 32 | 37 | 37 | 37 | 37 | 37 | 37 |
| Temperature granules in granulator | 100 | 100 | 100 | 100 | 100 | 100 | 100 | 100 | 100 |
| Final product after sieving and cooling | | | | | | | | | |
| temperature | 25 | 25 | 25 | 25 | 25 | 25 | 25 | 25 | 25 |
| chemical analysis | | | | | | | | | |
| moisture | 0.21 | 0.12 | 0.08 | 0.03 | 0.09 | 0.08 | 0.09 | 0.12 | 0.08 |
| formaldehyde equivalent | 0.23 | 0.24 | 0.28 | none | 0.12 | 0.19 | 0.25 | 0.28 | 0.30 |
| Granulometry | | | | | | | | | |
| >5.0 mm | 3.8 | 20.0 | 5.9 | 5.6 | 1.3 | 1.1 | 1.3 | 1.6 | 6.1 |
| 4.0–5.0 mm | 14.6 | 43.9 | 42.4 | 53.4 | 55.6 | 59.5 | 61.2 | 47.2 | 42.4 |
| 2.5–4.0 mm | 79.2 | 31.4 | 44.2 | 37.3 | 41.7 | 37.9 | 37.1 | 43.3 | 44.1 |
| <2.5 mm | 2.4 | 5.7 | 7.5 | 3.7 | 1.4 | 1.5 | 0.4 | 7.9 | 7.4 |
| Crushing strength | | | | | | | | | |
| φ 2.0 mm | 1.40 | 1.68 | 2.08 | 1.31 | 1.68 | 1.60 | 1.68 | 1.99 | 1.93 |
| φ 2.5 mm | 1.78 | 2.21 | 2.68 | 1.90 | 2.21 | 2.08 | 2.23 | 2.63 | 2.54 |
| φ 3.15 mm | 2.07 | 2.76 | 3.08 | 2.10 | 2.76 | 2.83 | 2.74 | 3.44 | 3.39 |
| φ 4.0 mm | 3.21 | 3.94 | 4.43 | 3.39 | 3.94 | 4.46 | 3.94 | 5.20 | 5.14 |
| T.V.A. abrasion test <1.25 mm % of 3.15-4.0 mm fraction | <1 | <1 | <1 | <1 | <1 | <1 | <1 | <1 | <1 |
| Dust formation during granulation | | | | | | | | | |
| % dust relative to urea solution sprayed | 3 | 1.5 | 1.0 | 2.5 | 1.5 | 1.0 | 0.8 | 0.7 | 0.7 |

TABLE B

| Concentration urea solution | $T_{bp}(°K)$ | $d_{bp}$ | $s_{bp}$ | $d$ | $s$ | $v$ | $54.4\sqrt{\dfrac{s}{d}}$ | $597\left(\dfrac{0.03}{\sqrt{s.d.}}\right)^{0.45}$ |
|---|---|---|---|---|---|---|---|---|
| 72% | 390.5 | 1.148 | 25.86 | 1.167 | 27.62 | 0.03 | 264.65 | 56.3807 |
| 80% | 396 | 1.166 | 26.64 | 1.187 | 28.61 | 0.03 | 267.07 | 55.7538 |
| 90% | 407 | 1.192 | 27.99 | 1.206 | 29.32 | 0.03 | 268.23 | 55.1643 |
| 96% | 423 | 1.200 | 29.28 | 1.222 | 31.48 | 0.03 | 276.11 | 54.2195 |

TABLE C

| Test | Conc. urea solution % | $Q_1 \cdot 1000$ | $Q_2$ | $\left(\dfrac{1000Q_1}{Q_2}\right)^{1.5}$ | V m/sec. | 1st term | 2nd term | D micron |
|---|---|---|---|---|---|---|---|---|
| 1 | 72 | 25.7 | 23.0 | 1.1812 | 241.94 | 1.09 | 66.60 | 68 |
| 2 | 72 | 23.6 | 23.0 | 1.0394 | 241.94 | 1.09 | 58.60 | 60 |
| 3 | 80 | 17.7 | 23.0 | 0.6751 | 241.94 | 1.10 | 37.64 | 39 |
| 4 | 80 | 35.8 | 23.0 | 1.9419 | 241.94 | 1.10 | 108.27 | 109 |
| 5 | 80 | 35.8 | 38.4 | 0.9002 | 403.93 | 0.66 | 50.19 | 51 |
| 6 | 90 | 35.2 | 23.0 | 1.8933 | 241.94 | 1.11 | 104.63 | 106 |
| 7 | 96 | 39.3 | 27.9 | 1.6718 | 293.48 | 0.94 | 90.64 | 92 |
| 8 | 96 | 34.4 | 31.7 | 1.1305 | 333.45 | 0.83 | 61.30 | 62 |
| 9 | 96 | 34.4 | 39.1 | 0.8252 | 411.29 | 0.67 | 44.74 | 45 |
| 10 | 96 | 29.5 | 42.8 | 0.5723 | 450.21 | 0.61 | 31.03 | 32 |
| 11 | 96 | 30.7 | 40.2 | 0.6674 | 422.86 | 0.65 | 36.19 | 37 |
| 12 | 96 | 30.7 | 40.2 | 0.6674 | 422.86 | 0.65 | 36.19 | 37 |

TABLE C-continued

| Test | Conc. urea solution % | $Q_1 \cdot 1000$ | $Q_2$ | $\left(\dfrac{1000 Q_1}{Q_2}\right)^{1.5}$ | V m/sec. | 1st term | 2nd term | D micron |
|---|---|---|---|---|---|---|---|---|
| 13 | 96 | 30.7 | 40.2 | 0.6674 | 422.86 | 0.65 | 36.19 | 37 |
| 14 | 96 | 30.7 | 40.2 | 0.6674 | 422.86 | 0.65 | 39.19 | 37 |
| 15 | 96 | 30.7 | 40.2 | 0.6674 | 422.86 | 0.65 | 36.19 | 37 |
| 16 | 96 | 30.7 | 40.2 | 0.6674 | 422.86 | 0.65 | 36.19 | 37 |

TABLE D

| Test no. | 4 | 5 | 6 | 7 | 8 | 9 | 10 |
|---|---|---|---|---|---|---|---|
| Chemical analysis | | | | | | | |
| moisture, % | 0.15 | 0.09 | 0.08 | 0.33 | 0.21 | 0.12 | 0.08 |
| biuret, % | 0.54 | 0.50 | 0.46 | 0.58 | 0.54 | 0.56 | 0.58 |
| Formurea 80, % | 0.39 | 0.43 | 0.40 | 0.38 | 0.40 | 0.42 | 0.48 |
| Physical analysis | | | | | | | |
| crushing strength, kg | | | | | | | |
| 1.75 mm φ | 0.85 | 0.98 | 0.73 | 0.60 | 0.95 | — | — |
| 2.0 mm φ | 0.98 | 1.61 | 0.91 | 0.85 | 1.40 | 1.68 | 2.08 |
| 2.5 mm φ | 1.30 | 2.05 | 1.26 | 0.97 | 1.78 | 2.21 | 2.68 |
| 3.15 mm φ | — | 2.35 | — | 1.55 | 2.07 | 2.76 | 3.03 |
| 4.00 mm φ | — | 3.71 | — | 1.77 | 3.21 | 3.94 | 4.43 |
| TVA abrasion test | | | | | | | |
| % 1.25 mm | 2.8 | <1 | 1 | <1 | <1 | <1 | <1 |

We claim:

1. A process for producing urea granules, characterized by spraying an aqueous solution consisting essentially of urea having a urea concentration of 70-99.9% by weight onto fluidized urea nuclei in the form of droplets having a mean drop diameter of 20-120 μm at a temperature at which the water is evaporated from the solution sprayed onto the nuclei, and urea crystallizes on the nuclei, to form granules having a desired size.

2. A process according to claim 1, wherein the urea solution contains 85-96% by weight of urea.

3. A process according to claim 2, wherein the urea solution is sprayed in the form of droplets having a mean drop diameter of 30-100 μm.

4. A process according to claim 3, wherein the droplets have a mean drop diameter of 30-60 μm.

5. A process according to claim 1, wherein the urea solution contains a crystallization retardant for the urea.

6. A process according to claim 5, wherein the crystallization retardant comprises formaldehyde or a water-soluble addition or condensation product of formaldehyde and urea in a proportion of 0.1-2%, calculated as formaldehyde on the weight of the urea solution.

7. A process according to claim 6, wherein the crystallization retardant is used in a proportion of 0.1-1%, in particular 0.5-1%, calculated as formaldehyde on the weight of the urea solution.

8. A process according to claim 5, wherein the crystallization retardant used is an aqueous solution consisting of approximately 20 parts by weight of water, 23 parts by weight of urea and 57 parts by weight of formaldehyde, with approximately 55% of the formaldehyde being substantially bonded as trimethylolurea and the balance of the formaldehyde being present in nonbonded condition.

9. A process according to claim 1, wherein the urea solution being sprayed has a crystallization point below 100° C., whereby practically no biuret is formed during the granulation.

10. A process according to claim 1, wherein the resulting granules are subjected to subsequent drying with air of 100°-150° C., so that the temperature of the granules is maintained between 70° and 90° C.

11. A process according to claim 1, wherein the resulting granules are cooled to a temperature of approximately 30° C. or lower.

* * * * *

UNITED STATES PATENT AND TRADEMARK OFFICE
CERTIFICATE OF CORRECTION

PATENT NO. : 4,219,589
DATED : August 26, 1980
INVENTOR(S) : Anton Niks, et al

It is certified that error appears in the above-identified patent and that said Letters Patent are hereby corrected as shown below:

Column 3, line 31, "ratio" should read as -- ration --

Column 5, line 1, "area" should read as -- urea --

Column 10, Table A, last column, "1.93" should read as -- 1.98 --

Column 9, Table A, column 3, "3.08" should read as -- 3.03 --

Column 9, Table A, column 4, "2.10" should read as -- 2.19 --

Signed and Sealed this

Twenty-fifth Day of November 1980

[SEAL]

Attest:

SIDNEY A. DIAMOND

Attesting Officer

Commissioner of Patents and Trademarks